(12) United States Patent
Capilla et al.

(10) Patent No.: US 7,728,573 B2
(45) Date of Patent: Jun. 1, 2010

(54) DC-DC CONVERTER CONTROLLER HAVING OPTIMIZED LOAD TRANSIENT RESPONSE AND METHOD THEREOF

(75) Inventors: Jose M. Capilla, Tournefeuille (FR); Olivier Causse, Leguevin (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 11/572,727

(22) PCT Filed: Oct. 24, 2005

(86) PCT No.: PCT/US2005/038408
§ 371 (c)(1), (2), (4) Date: Jan. 26, 2007

(87) PCT Pub. No.: WO2007/050056
PCT Pub. Date: May 3, 2007

(65) Prior Publication Data
US 2008/0315853 A1    Dec. 25, 2008

(51) Int. Cl.
*G05F 1/00*    (2006.01)

(52) U.S. Cl. ............... 323/288; 323/282; 323/283; 323/284; 323/271

(58) Field of Classification Search ............... 323/282, 323/288, 222, 283, 271, 284
See application file for complete search history.

(56) References Cited

U.S. PATENT DOCUMENTS

| | | | | |
|---|---|---|---|---|
| 5,481,178 | A | * | 1/1996 | Wilcox et al. ............... 323/287 |
| 2006/0017421 | A1 | * | 1/2006 | Solie et al. ............... 323/225 |
| 2006/0125454 | A1 | * | 6/2006 | Chen et al. ............... 323/282 |
| 2007/0018624 | A1 | * | 1/2007 | Guo ............... 323/282 |

\* cited by examiner

*Primary Examiner*—Bao Q Vu
*Assistant Examiner*—Nguyen Tran
(74) *Attorney, Agent, or Firm*—Robert F. Hightower

(57) ABSTRACT

A power supply controller (25) is configured to accurately adjust the value of an output voltage of a power supply system (10) responsively to the output voltage increasing to an undesirable value. The controller (25) accurately limits an upper value of the output voltage during a light load condition, and rapidly reduces the value of the output voltage during a light load condition, and different control signals to control the switching of the output transistors facilitates rapidly reducing the output voltage.

20 Claims, 4 Drawing Sheets

DC-DC CONVERTER CONTROLLER HAVING OPTIMIZED LOAD TRANSIENT RESPONSE AND METHOD THEREOF

BACKGROUND OF THE INVENTION

The present invention relates, in general, to electronics, and more particularly, to methods of forming semiconductor devices and structure.

In the past, the semiconductor industry utilized various methods and structures to make power supply controllers for power supply systems. Some applications of the previous power supply controllers included loads that could reduce the amount of current required to operate below. Some of the previous power supply controllers could detect the reduced current demand and change the operating mode to a light load mode. These previous power supply controllers generally cannot rapidly decrease the value of the output voltage of the power supply.

Accordingly, it is desirable to have a method of forming a power supply controller that facilitates detecting a light load current demand rapidly reducing the value of the output voltage.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
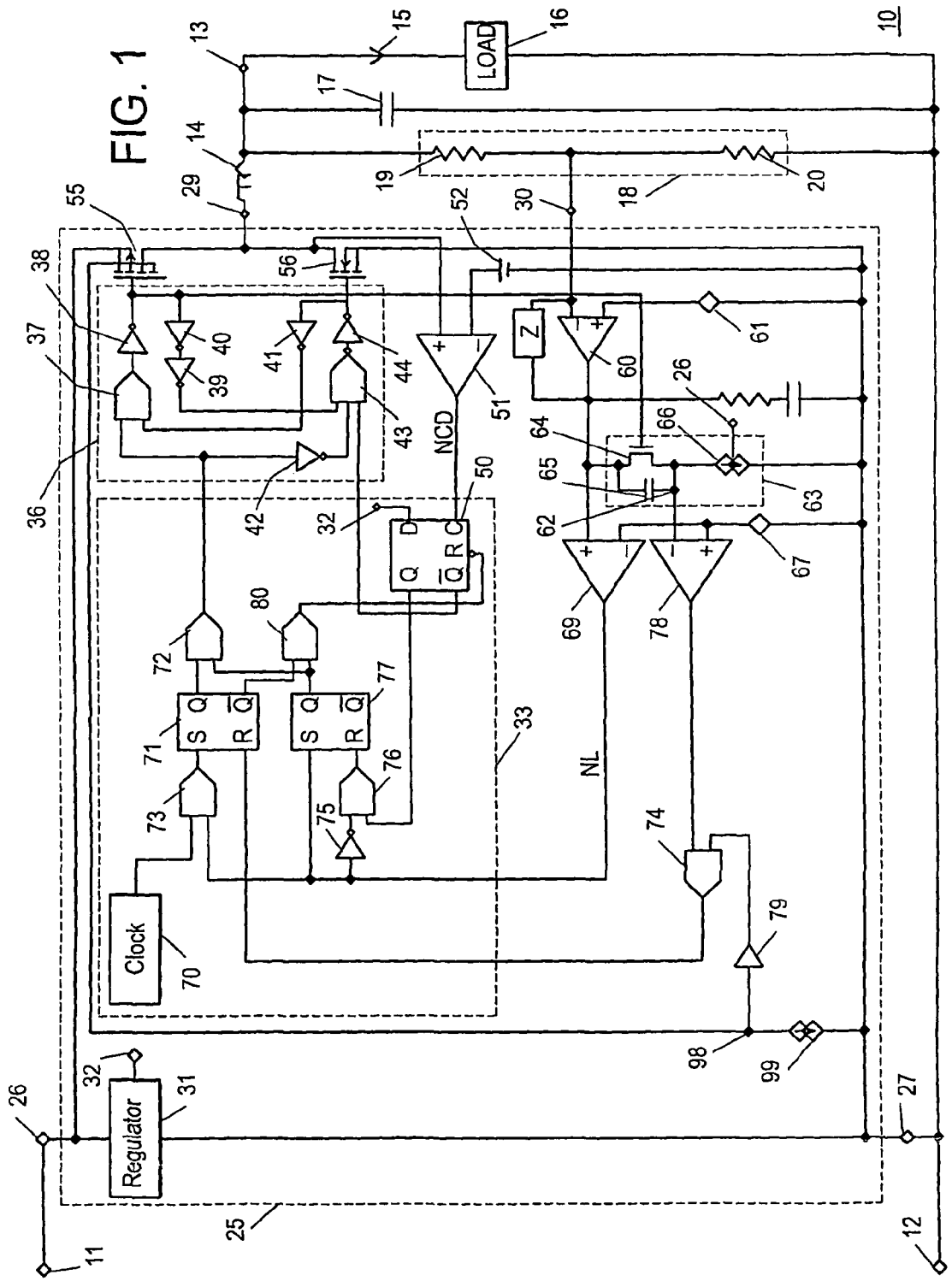
FIG. 1 schematically illustrates an embodiment of a portion of a power supply control system including a power supply controller in accordance with the present invention.

FIG. 1 schematically illustrates an embodiment of a power supply system 10 that includes an exemplary embodiment of a portion of a power supply controller 25 that accurately adjusts the value of an output voltage of system 10 responsively to the output voltage increasing to an undesirable value. System 10 receives power between a power input terminal 11 and a power return terminal 12, and generates the output voltage between a voltage output terminal 13 and terminal 12. System 10 typically includes a load 16 that is connected between terminals 12 and 13 in order to receive the output voltage, an energy storage inductor 14, a smoothing capacitor 17, and a feedback network 18. Feedback network 18 may be any one of a variety of feedback networks that are well known to those skilled in the art including the exemplary embodiment of a voltage divider, formed by a first resistor 19 and a second resistor 20, that generates a feedback signal that is representative of the value of the output voltage. The feedback signal generally is formed at a common node between resistors 19 and 20. In some embodiments, feedback network 18 may be a portion of controller 25. Also, capacitors may be connected in parallel with each of resistors 19 and 20 for frequency compensation.

Controller 25 includes a voltage input 26 and a voltage return 27 that are typically connected to respective terminals 11 and 12 to receive an input voltage. A first power switch or transistor 55 and a second power switch or transistor 56 of controller 25 are selectively switched in order to provide a current through an output 29 of controller 25 and regulate the value of the output voltage on terminal 13. A driver circuit 36 of controller 25 is utilized to assist in controlling the switching of transistors 55 and 56. For the exemplary embodiment illustrated in FIG. 1, controller 25 is configured as a voltage mode switching controller and typically includes a logic and control circuit 33, an error amplifier 60, a mode detection comparator 69, a negative current comparator 51, a ramp generator or ramp 63, a PWM comparator 78, a current sense detector 79, reference generators or references 61 and 67, and an AND gate 74. Amplifier 60 typically is a transconductance amplifier and has a compensation network, illustrated by an impedance Z along with a resistor and a capacitor on the output of amplifier 60, to provide frequency compensation and gain control. In some embodiments impedance Z may be a derivator. In most embodiments, controller 25 also includes an internal regulator 31 that is connected between input 26 and return 27 in order to receive the input voltage and create an internal operating voltage on an output 32 that is used for operating the various elements of controller 25 such as amplifier 60, comparator 69, and control circuit 33. Driver circuit 36 receives control signals and responsively forms a first switching signal that is utilized to control transistor 55 and a second switching signal that is utilized to control transistor 56. In the exemplary embodiment illustrated in FIG. 1, transistor 55 is a P-channel SenseFET type of transistor that includes a sense element or sense transistor that provides a sense current that is representative of the current flowing through transistor 55. A SenseFET type of transistor generally is formed to include a main transistor and a sensing transistor. Typically, the SenseFET type of transistor is formed of many transistor cells that are interconnected to form a large transistor. For a P-channel SenseFET type of transistor, a few of the cells have their drains separated from the drains of the remaining cells and are brought to a separate external terminal or sense terminal of the sense transistor of the SenseFET. The remainder of the drains are connected together to form the main drain of the main portion of the transistor. One example of a SenseFET type of transistor is disclosed in U.S. Pat. No. 4,553,084 issued to Robert Wrathall on Nov. 12, 1985, which is hereby incorporated herein by reference. SENSEFET is a trademark of Motorola, Inc. of Schaumburg, Ill.

Driver circuit 36 typically includes an inverting buffer 38 and an inverting buffer 44 that have output stages that are sufficient to drive the load presented by the control electrode of the power switches, such as the gates of respective transistors 55 and 56. Buffers 38 and 44 generate respective first and second switching signals that drive the gates of respective transistors 55 and 56. Circuit 36 also includes logic to control the switching states of transistors 55 and 56 including an AND gate 37, a NAND gate 43, and delay inverters 39, 40, 41, and 42. Logic and control circuit 33 includes logic that generates a switching control signal, such as a pulse width modulated (PWM) control signal, and a negative current detection (NCD) control signal that are used by circuit 36. Circuit 33 generally includes a clock generator or clock 70, a PWM latch 71, a mode latch 77, a negative current detection (NCD) flip-flop 50, inverter 75, and AND gates 72, 73, 76, and 80.

Ramp 63 includes a ramp capacitor 65, a ramp current source 66, and a discharge switch or discharge transistor 64. For the exemplary embodiment illustrated in FIG. 1, ramp current source 66 is a variable current source that varies the current through source 66 proportionally to variations in the value of the input voltage from input 26. The switching signal is used to control transistor 55 is also used to control transistor 64. As the first switching control signal begins enabling transistor 55, the first switching control signal also disables transistor 64 which allows capacitor 65 to charge a rate determined by the difference between the value of current source 66 and the value of the error signal from amplifier 60. The error signal is applied to one side of capacitor 65 and current source 66 is applied to the other side of capacitor 65. In the preferred embodiment, the error signal is an error voltage.

Controller 25 is configured to operate in a normal operating mode and a light load operating mode. During normal operation in the normal operating mode, load 16 is active and requires a load current 15 which requires controller 25 to supply a current to inductor 14 to maintain load current 15. In this normal mode, controller 25 switches transistors 55 and 56 to supply current to and discharge current from inductor 14. If the value of load current 15 required by load 16 decreases, the switching of transistors 55 and 56 may cause the value of the output voltage to increase. If the output voltage increases too far, it may increase past the desired value of the output voltage and may damage load 16. Thus, in this light load condition controller 25 is configured to limit the value of the output voltage to an upper limit that is established substantially by the gain of amplifier 60 and the value of the reference signal from reference 67. Those skilled in the art will appreciate that there may be minor parasitic offsets and delays so that the upper limit is not established exactly by the value of the second reference signal. Amplifier 60 receives the feedback signal from an input 30 of controller 25 and generates an error signal that represents the deviation of the feedback signal from the value of a first reference signal supplied by reference 61. Mode detection comparator 69 receives the error signal and compares the error signal to a second reference signal from reference 67. If the error signal is greater than the second reference signal, a normal load (NL) control signal or NL signal on the output of comparator 69 is high indicating that the value of current 15 required by load 16 keeps the output voltage less than the upper limit that is determined substantially by the second reference signal. The high NL signal sets latch 77 to set controller 25 to the normal operating mode. Conversely, if the value of the error signal is less than the value set by the second reference signal from reference 67, comparator 69 forces the NL signal low indicating that the value of current 15 required by load 16 is low and the value of the output voltage has increased to a value no less than the upper limit. As will be seen further hereinafter, the low NL signal assists in setting controller 25 to the light load operating mode.

In operation and assuming that the value of current 15 required by load 16 keeps the output voltage less than the upper limit value so that the NL signal is high and has set latch 77, clock 70 generates a clock signal that is utilized to control the timing of the switching signals used to drive transistors 55 and 56. Thus, the frequency of the clock signal from clock 70 sets a switching period during which the first and second switching signals may be formed and utilized to drive transistors 55 and 56. Since the NL signal is high, the high from clock 70 propagates through gate 73 and sets PWM latch 71. The low from the Q bar output of latch 71 clears flip-flop 50. Because latch 77 is set, the high from the Q output of latch 71 propagates through gate 72 and is received by circuit 36. The high from gate 72 forces the output of inverter 42 low and the output of gate 43 high and the output of buffer 44 low to begin disabling transistor 56. The low from buffer 44 forces the output of delay inverter 41 high which, along with the high from gate 72, forces the output of gate 37 high. The high from gate 37 begins enabling transistor 55 to supply current through output 29 to charge inductor 14. The sense transistor of transistor 55, supplies a sense current to node 98. The sense current and current source 99 function as a current comparator that forces node 98 to the voltage from the greater of current source 99 or the sense current. If the value of the voltage formed at node 98 is greater than the threshold value of detector 79, the output of detector 79 goes high indicating that the value of current supplied to inductor 14 is greater than a minimum value desired for charging inductor 14. If the output of detector 79 is low, it indicates that the value of the current used to charge inductor 14 is less than the minimum desired value for charging inductor 14.

Error amplifier 60 receives the feedback signal from input 30 and forms the error signal. Those skilled in the art will appreciate that the error signal from amplifier 60 varies in value responsively to variations in the value of the output voltage on terminal 13. Ramp 63 receives the error signal and sums the error signal with the ramp from capacitor 65 and forms a modulated error signal on a summing node 62. PWM comparator 78 compares the modulated error signal to the second reference signal from reference 67 and forms a modulated PWM signal on an output of comparator 78. When the value of the modulated error signal reaches a value that is no less than the second reference signal from reference 67, comparator 78 forces the modulated PWM signal high indicating that transistor 55 should be disabled. The modulated PWM signal is received by gate 74. If the output of current detector 79 is high, the modulated PWM signal forces the output of gate 74 high which resets PWM latch 71. The high from the Q bar output of latch 71 forces the output of gate 80 high to remove the reset signal from flip-flop 50. The low from the Q output of latch 71 forces the switching control signal on the output of gate 72 low. Circuit 36 receives the low which forces the output of gate 37 low and the output of buffer 38 high thereby beginning to disable transistor 55. The low from gate 72 also forces the output of inverter 42 high which is received by one input of gate 43. The high from buffer 38 propagates through delay inverters 39 and 40 and forces another input of gate 43 high thereby forcing the output of gate 43 low and the output of buffer 44 high to begin enabling transistor 56. Note that flip-flop 50 was previously cleared which applied a high to the remaining input of gate 43. Those skilled in the art will appreciate that inverters 39 and 40 form a delay that prevents enabling transistor 56 until transistor 55 is beginning to be disabled which assists in preventing shoot-through currents through transistors 55 and 56. During this delay time, current continuity is provided through the body diode, not shown, of transistor 56. Enabling transistor 56 begins discharging the energy stored in inductor 14.

Transistor 56 remains enabled and discharging inductor 14 until the value of the discharge current from inductor 14 is less than the value of return 27 and begins to reverse polarity. Negative current comparator 51 is configured to detect the current reversal and form a second control signal or negative current detection (NCD) control signal on the output of comparator 51 indicating the discharge current from inductor 14 has reversed by at least a small amount. In one embodiment, the reference input of comparator 51 is configured to have a negative offset voltage to ensure that comparator 51 detects a negative current and not a positive or zero current. The offset typically is an offset formed on the input stage of comparator 51 but may be an external voltage applied to comparator 51. The offset is illustrated in FIG. 1 by an offset voltage 52. Typically, the amount of the offset ensures that the current from inductor 14 has reversed by at least a small amount including an amount between approximately 0.05 and sixty (60) milli-amperes and preferably by approximately twenty (20) milli-amperes. The negative current detection forces the NCD control signal high which sets flip-flop 50. The low from the Q bar output disables gate 43 and forces the output of buffer 44 low which begins disabling transistor 56. The high from the Q output enables gate 76 but the output of gate 76 remains low because the NL signal remains high. As long as controller 25 can control the value of the output voltage to keep the feedback signal close to the value of the first reference signal from reference 61, the NL remains high and controller 25 and system 10 remain operating in the normal operating mode, thus, clock 70 continues to initiate switching cycles for switching transistors 55 and 56. Those skilled in the art will appreciate that during the normal operating mode, another clock signal from clock 70 may start another switching cycle of controller 25 thereby disabling transistor 56 before the NCD signal can disable transistor 56.

During the operation of controller 25, the value of current 15 required by load 16 may decrease. In this condition when controller 25 enables transistor 55 to charge inductor 14, the value of the output voltage on terminal 13 may increase due to the decreased current required by load 16. The increased output voltage also increases the feedback signal and decreases the value of the error signal on the output of amplifier 60. As the value of the output voltage increases to no less than the upper limit, the error signal decreases to less than the second reference signal from reference 67. Comparator 69 responsively forces the NL signal low indicating that the current requirements of load 16 have decreased below the value required to prevent the output voltage from increasing. The low from comparator 69 forces the output of gate 73 low thereby inhibiting clock 70 from initiating another switching cycle of controller 25. Since latch 50 previously was reset when transistor 55 was enabled, the low from comparator 69 does not affect the state of latch 77. Thus, transistor 55 remains enabled independently of the output of comparator 69 changing state. Consequently, controller 25 continues to operate in the normal operating mode, but without clock 70 generating more switching cycles, so that ramp 63 forms the modulated error signal, PWM comparator 78 forms the modulated PWM signal, and the output of gate 74 going high responsively to the sense current from transistor 55. The high from gate 74 resets latch 71. The high Q bar output removes the reset signal from flip-flop 50. The low Q output of latch 71 forces gate 72 low and the output of buffer 38 high thereby beginning to disable transistor 55. After the delay of inverters 39 and 40, the low from gate 72 begins enabling transistor 56. Enabling transistor 56 discharges the energy stored in inductor 14 to assist in preventing the value of the output voltage from the increasing further and to begin quickly decreasing the value of the output voltage. Transistor 56 remains enabled and discharging inductor 14 until the value of the discharge current from inductor 14 reverses in value and forces the NCD control signal on the output of comparator 51 high. The high from comparator 51 sets flip-flop 50. The low Q bar output forces the output of gate 43 high and the output of buffer 44 low to begin disabling transistor 56. Since the NL signal is low, the high Q output of flip-flop 50 resets latch 77 and places controller 25 in the light load operating mode. As long as the value of the output voltage is no less than the upper limit, the error signal remains less than the value of the second reference signal from reference 67 and the NL signal remains low inhibiting clock 70 from initiating another switching cycle of controller 25. As can be seen, a first control signal inhibits the initiation of subsequent switching cycles from controller 25. The charging of inductor 14 is disabled responsively to the value of the output voltage and the charging current, and discharging of inductor 14 is enabled responsively to disabling the charging of inductor 14. Subsequently, as the discharge current from inductor 14 reverses, a second control signal terminates the discharging of inductor 14. Those skilled in the art will appreciate that the NL control signal or the Q output of latch 77 may also be used to disable other internal blocks, not shown, in order to assist in reducing power dissipation.

As the output voltage decreases below the upper limit, the value of the error voltage increases and comparator 69 forces the NL signal high to permit clock 70 to initiate switching cycles of controller 25 and to reset latch 77 thereby again setting controller 25 to operate in the normal operating mode.

In order to implement this functionality for controller 25, regulator 31 is connected between input 26 and return 27. Input 26 is connected to the main source of transistor 55. The sense drain or the drain of the sense transistor of transistor 55 is commonly connected to node 98, a first terminal of current source 99, and an input of detector 79. A second terminal of source 99 is connected to return 27. A drain of transistor 55 is commonly connected to output 29, a non-inverting input of comparator 51, and to a drain of transistor 56. A source of transistor 56 is connected to return 27. A gate of transistor 55 is commonly connected to the output of buffer 38, an input of inverter 40, and the gate of transistor 64. An output of inverter 40 is connected to an input of inverter 39 which has an output connected to a first input of gate 43. A second input of gate 43 is connected to an output of inverter 42 which has an input commonly connected to a first input of gate 37 and the output of gate 72. A third input of gate 43 is connected to the Q bar output of flip-flop 50. An output of gate 43 is connected to an input of buffer 44 which has an output commonly connected to the gate of transistor 56 and an input of inverter 41. An output of inverter 41 is connected to a second input of gate 37. An output of gate 37 is connected to an input a buffer 38. A first input of gate 72 is connected to the Q output of latch 71 and a second input of gate 72 is commonly connected to the Q output of latch 77, and a first input of gate 80. The Q bar output of latch 71 is connected to a second input of gate 80 which has an output connected to the reset input of flip-flop 50. The set input of latch 71 is connected to an output of gate 73. A first input of gate 73 is connected to the output of clock 70 and a second input of gate 73 is commonly connected to the set input of latch 77, an input of inverter 75, and the output of comparator 69. The output of inverter 75 is connected to a first input of gate 76. An output of gate 76 is connected to the reset input of latch 77 and a second input of gate 76 is connected to the Q output of flip-flop 50. An inverting input of comparator 51 is connected to one terminal of offset 52 which has a second terminal connected to return 27. The output of comparator 51 is connected to the clock input of flip-flop 50. A D input of flip-flop 50 is connected to output 32 of regulator 31. An inverting input of amplifier 60 is connected to receive the feedback signal from input 30. A non-inverting input of amplifier 60 is connected to a first terminal of reference 61 which has a second terminal connected to return 27. The output of amplifier 60 is commonly connected to a non-inverting input of comparator 69, a drain of transistor 64, and a first terminal of capacitor 65. A source of transistor 64 is commonly connected to node 62, a second terminal of capacitor 65, a first terminal of current source 66, and an inverting input of comparator 78. A second terminal of current source 66 is connected to return 27. A first terminal of reference 67 is connected to return 27 and a second terminal is commonly connected to an inverting input of comparator 69 and an inverting input of comparator 78. The output of comparator 78 is connected to a first input of gate 74. A second input of gate 74 is connected to an output of detector 79. An output of gate 74 is connected to a reset input of latch 71.

Figure 2:
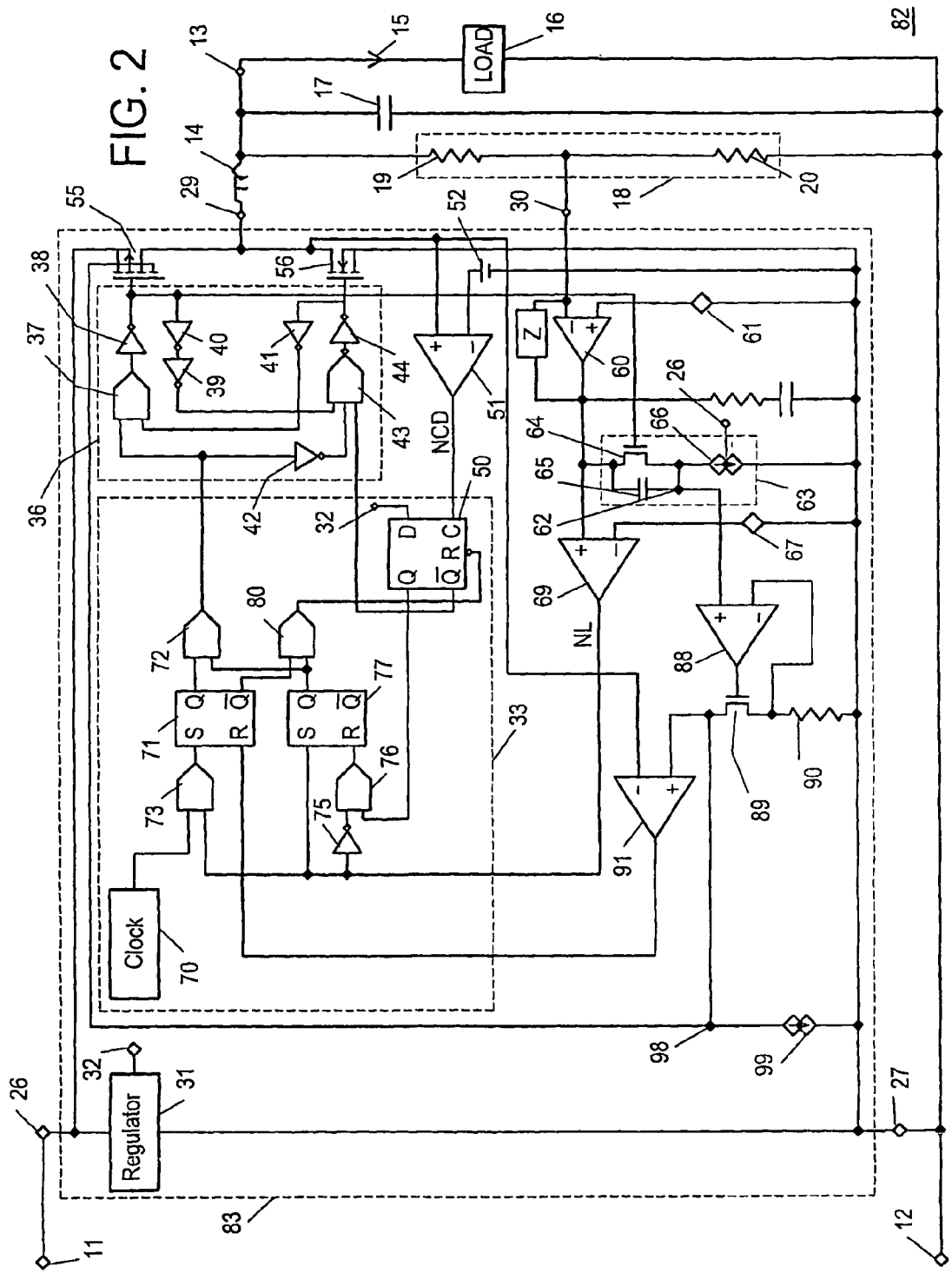
FIG. 2 schematically illustrates an embodiment of a portion of another power supply control system including another power supply controller that is an alternate embodiment of the system and controller of FIG. 1 in accordance with the present invention.

FIG. 2 schematically illustrates an embodiment of a power supply system 82 that is an alternate embodiment of system 10 described in the description of FIG. 1. System 82 includes an exemplary embodiment of a portion of a power supply controller 83 that is an alternate embodiment of controller 25 described in the description of FIG. 1. Controller 83 functions similarly to controller 25, however, controller 83 is a current mode controller instead of a voltage mode controller. Comparator 78, gate 74, and detector 79 of controller 25 are replaced by amplifier 88, transistor 89, resistor 90, and comparator 91. An amplifier 88, a transistor 89, and a resistor 90 are used for the current mode regulation loop of controller 83. Amplifier 88 receives the modulated error signal from node 62. Amplifier 88 together with transistor 89 and resistor 90 convert the voltage from node 62 into a current. The output of comparator 91 provides a signal that functions similarly to the output of gate 74.

Figure 3:
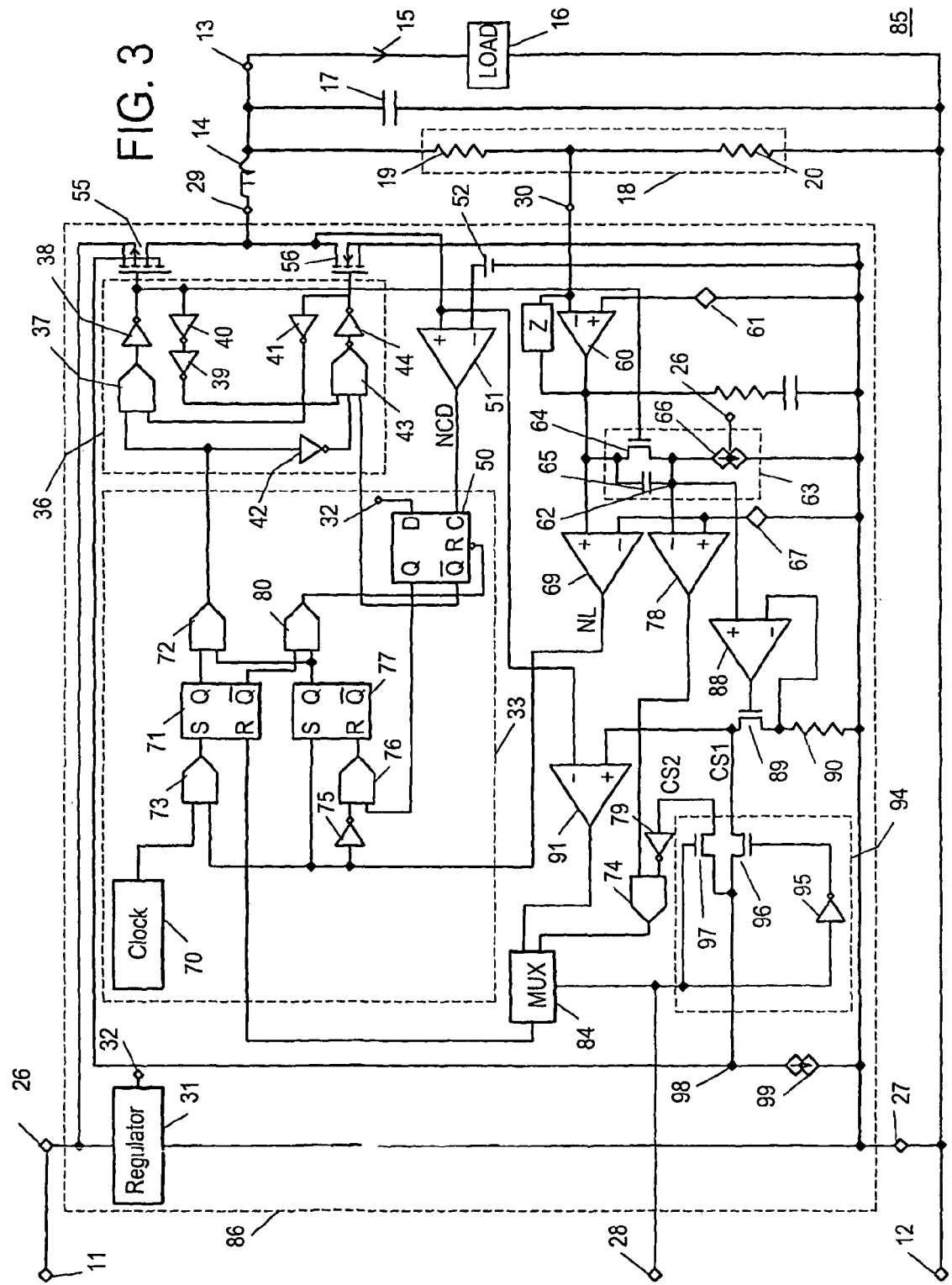
FIG. 3 schematically illustrates an embodiment of a portion of yet another power supply control system including yet another power supply controller that is an alternate embodiment of the system and controller of FIG. 1 and FIG. 2 in accordance with the present invention.

FIG. 3 schematically illustrates an embodiment of a power supply system 85 that is an alternate embodiment of system 10 described in the description of FIG. 1. System 85 includes an exemplary embodiment of a portion of a power supply controller 86 that is an alternate embodiment of controller 25 described in the description of FIG. 1. Controller 86 is selectable between a voltage mode controller such as controller 25 of FIG. 1 and a current mode such as controller 83 of FIG. 2. Controller 86 includes a mode control input 28 that facilitates switching between the voltage mode controller configuration and the current mode configuration. An analog multiplexer 94 receives the mode control signal and responsively selects the signal from node 98 to either detector 79 or comparator 91. A digital multiplexer 84 receives the mode control signal and responsively selects either the output of gate 74 or comparator 91 to the reset input of latch 71. Those skilled in the art will appreciate that the signal on input 28 typically has to also modify the value of capacitor 65, current source 66, and impedance Z in order to provide proper switching between the appropriate compensation for the two different modes.

Figure 4:
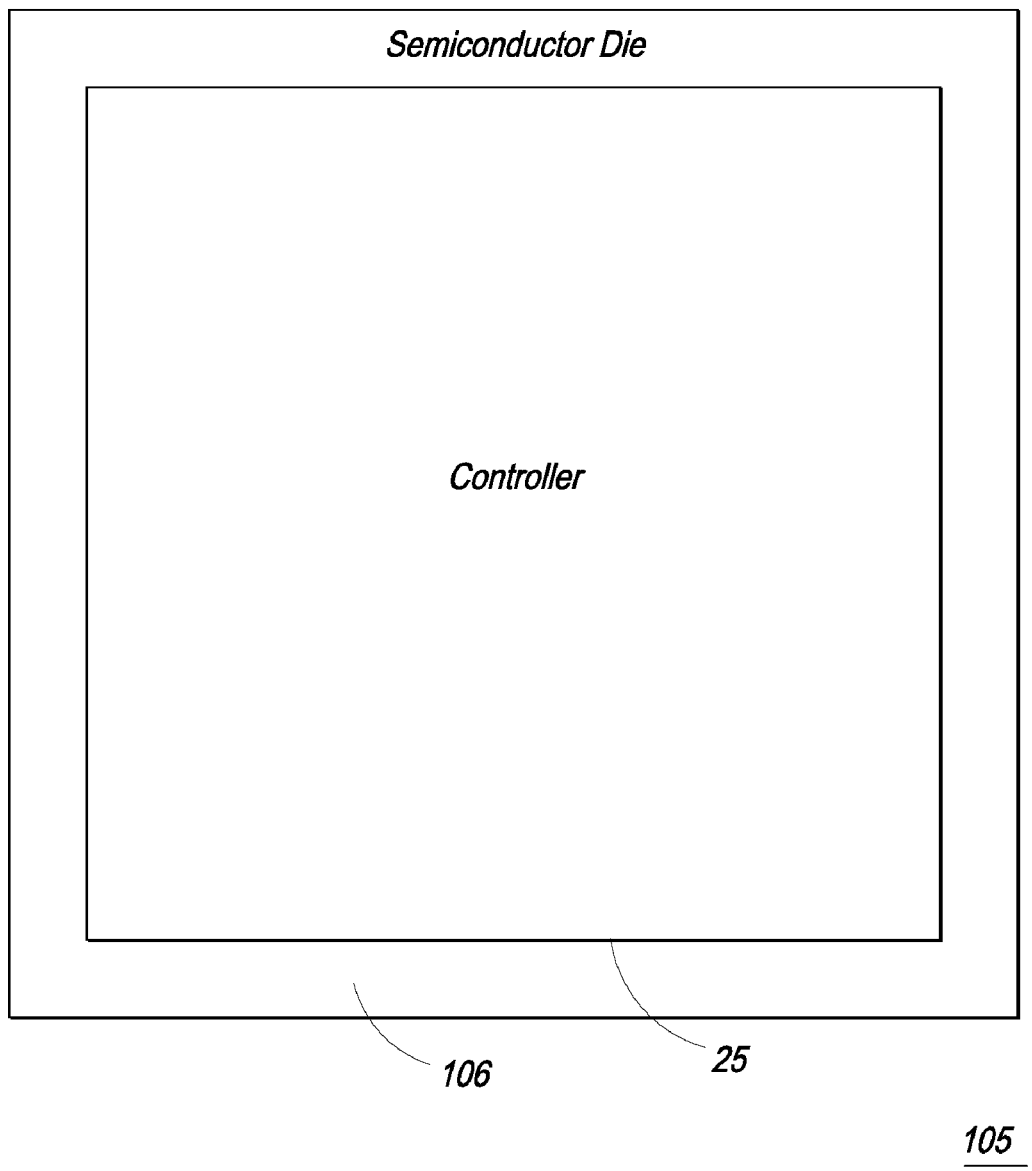
FIG. 4 schematically illustrates an enlarged plan view of a semiconductor device that includes the power supply controller of FIG. 1 in accordance with the present invention.

FIG. 4 schematically illustrates an enlarged plan view of a portion of an embodiment of a semiconductor device 105 that is formed on a semiconductor die 106. Controller 25 is formed on die 106. Die 106 may also include other circuits that are not shown in FIG. 4 for simplicity of the drawing. Controller 25 and device 105 are formed on die 106 by semiconductor manufacturing techniques that are well known to those skilled in the art. In other embodiments either controller 83 or 86 may be formed on die 106 instead of controller 25

In view of all of the above, it is evident that a novel device and method is disclosed. Included, among other features, is forming a controller that accurately limits an upper limit of the output voltage during a light load condition, and rapidly reduces the value of the output voltage to a desired value. Using two different control signals to control the switching of the output transistors facilitates rapidly reducing the value of the output voltage.

While the subject matter of the invention is described with specific preferred embodiments, it is evident that many alternatives and variations will be apparent to those skilled in the semiconductor arts. More specifically the subject matter of the invention has been described for a particular logic structure, although the method is directly applicable to other logic implementations that control the output transistors to rapidly reduce the value of the output voltage. Those skilled in the art will appreciate that controllers 25, 83, and 86 may have multiple voltage inputs and returns that are similar to input 26 and return 27. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a power supply controller comprising:
    configuring the power supply controller to control a first switch and a second switch to regulate an output voltage to a first value;
    configuring a control circuit of the power supply controller to set a first state of a first control signal responsively to a second value of the output voltage that is greater than the first value and responsively inhibit subsequent switching cycles of the power supply controller; and
    configuring the control circuit to disable the first switch and disable the second switch independently of the first control signal during the first state of the first control signal.

2. The method of claim 1 further including configuring the control circuit to set a first state of a second control signal and responsively disable the second switch.

3. The method of claim 2 wherein configuring the control circuit of the power supply controller to set the first state of the second control signal includes configuring the control circuit to set the first state of the second control signal at least a portion a time that the first control signal has the first state.

4. A method of forming a power supply controller comprising:
    configuring the power supply controller to control a first switch and a second switch to regulate an output voltage to a first value;
    configuring a control circuit of the power supply controller to set a first state of a first control signal responsively to a second value of the output voltage that is greater than the first value and responsively inhibit subsequent switching cycles of the power supply controller;
    configuring the control circuit to disable the first switch and disable the second switch independently of the first control signal; and
    configuring the control circuit to set a first state of a second control signal and disable the second switch responsively to detecting a reversal of current in an inductor coupled to the power supply controller wherein the control circuit sets the first state of the second control signal at least a portion a time that the first control signal has the first state.

5. The method of claim 4 wherein configuring the control circuit to set the first state of the second control signal and disable the second switch responsively to detecting the reversal of current in the inductor includes coupling a comparator to receive a signal representative of current in the inductor and to compare the signal to a negative reference value.

6. The method of claim 1 wherein configuring the power supply controller to control the first switch and the second switch to regulate the output voltage to the first value includes configuring the control circuit to enable switching the first switch and the second switch responsively to a feedback signal in response to either the first state or a second state of the first control signal wherein the feedback signal is representative of the output voltage.

7. The method of claim 1 wherein configuring the power supply controller to control the first switch and the second switch to regulate the output voltage to the first value includes configuring an error amplifier to receive a feedback signal and form an error signal representative of a deviation of the output voltage from the first value and further including coupling a first comparator to receive the error signal and form the first control signal.

8. The method of claim 7 further including configuring a second comparator to control disabling the first switch and enabling the second switch.

9. The method of claim 1 wherein configuring the control circuit of the power supply controller to set the first state of the first control signal includes configuring the power supply controller to compare an output of an error amplifier of the power supply controller to a reference voltage to determine the second value of the output voltage.

10. The method of claim 1 further including configuring a current detection circuit to detect a current reversal of discharge current in an inductor coupled to the power supply controller and responsively disable the second switch.

11. A power supply controller comprising:
a first switch;
a second switch coupled in series with the first switch;
a first control circuit configured to form switching cycles to operate the first switch and the second switch and regulate an output voltage substantially to a first value during a first operating mode of the power supply controller; and
a second control circuit configured to form a first state of a first control signal responsively to a second value of the output voltage wherein the second value is greater than the first value and wherein the first control signal is operably coupled to inhibit forming subsequent switching cycles and does not operate the first switch or the second switch.

12. The power supply controller of claim 11 further including a third control circuit operably coupled to form a second control signal to disable the second switch independently of the first control signal.

13. The power supply controller of claim 11 wherein the first control circuit is configured to maintain an enabled state of the first switch subsequent to the second control circuit forming the first state of the first control signal.

14. The power supply controller of claim 11 wherein the first control circuit is configured to enable the second switch a portion of a time during which the second control circuit forms the first state of the first control signal.

15. The power supply controller of claim 11 wherein the first operating mode is a normal operating mode.

16. The power supply controller of claim 11 wherein the second control circuit is operably coupled to disable the first switch and enable the second switch responsively to the output voltage increasing to the second value.

17. The power supply controller of claim 11 wherein the second control circuit includes a first comparator coupled to receive an error signal from an error amplifier and responsively form the first control signal.

18. A power supply controller comprising:
a first switch;
a second switch coupled in series with the first switch;
a first control circuit configured to form switching cycles to operate the first switch and the second switch and regulate an output voltage substantially to a first value during a first operating mode of the power supply controller;
a second control circuit having a first comparator coupled to receive an error signal from an error amplifier and responsively form a first control signal wherein a first state of the first control signal is formed responsively to a second value of the output voltage wherein the second value is greater than the first value and wherein the first control signal is operably coupled to inhibit forming subsequent switching cycles and does not operate the first switch or the second switch; and
a ramp circuit coupled to sum the error signal with a ramp signal and form a modulated error signal and further including a second comparator configured to receive the modulated error signal and form a third control signal that is used to operate the first switch and the second switch to regulate the output voltage to the first value.

19. The power supply controller of claim 18 further including an amplifier coupled to receive the modulated error signal and to convert the result to a current.

20. The power supply controller of claim 17 further including a ramp circuit coupled to sum the error signal with a ramp signal and form a modulated error signal and further including a second comparator coupled to use the modulated error signal and a current sense signal to operate the first switch and the second switch to regulate the output voltage to the first value.

* * * * *